A. D. CHRONIS.
BREECH BLOCK MECHANISM FOR FIREARMS OR GUNS.
APPLICATION FILED DEC. 7, 1910.
1,043,670.
Patented Nov. 5, 1912.
13 SHEETS—SHEET 1.
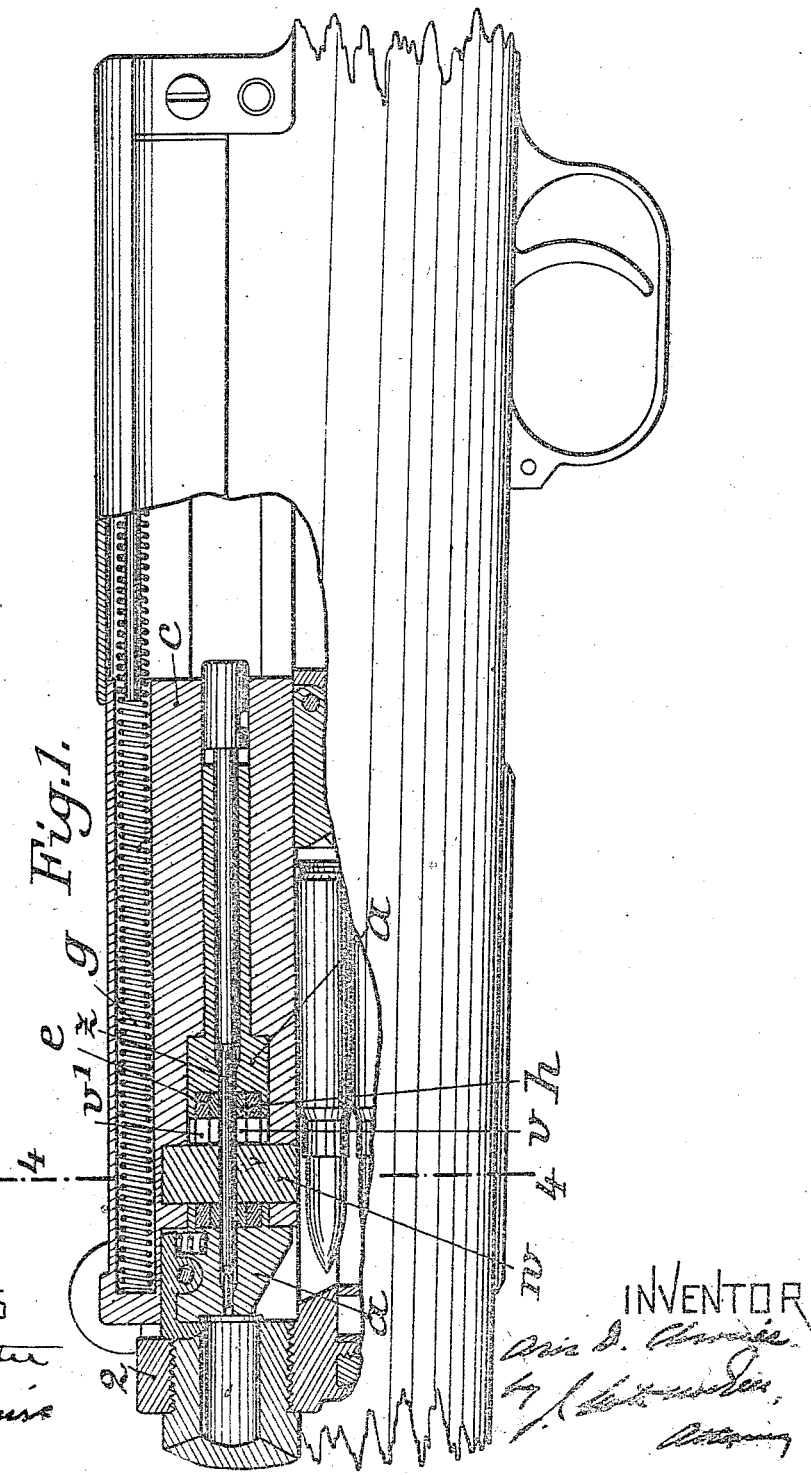

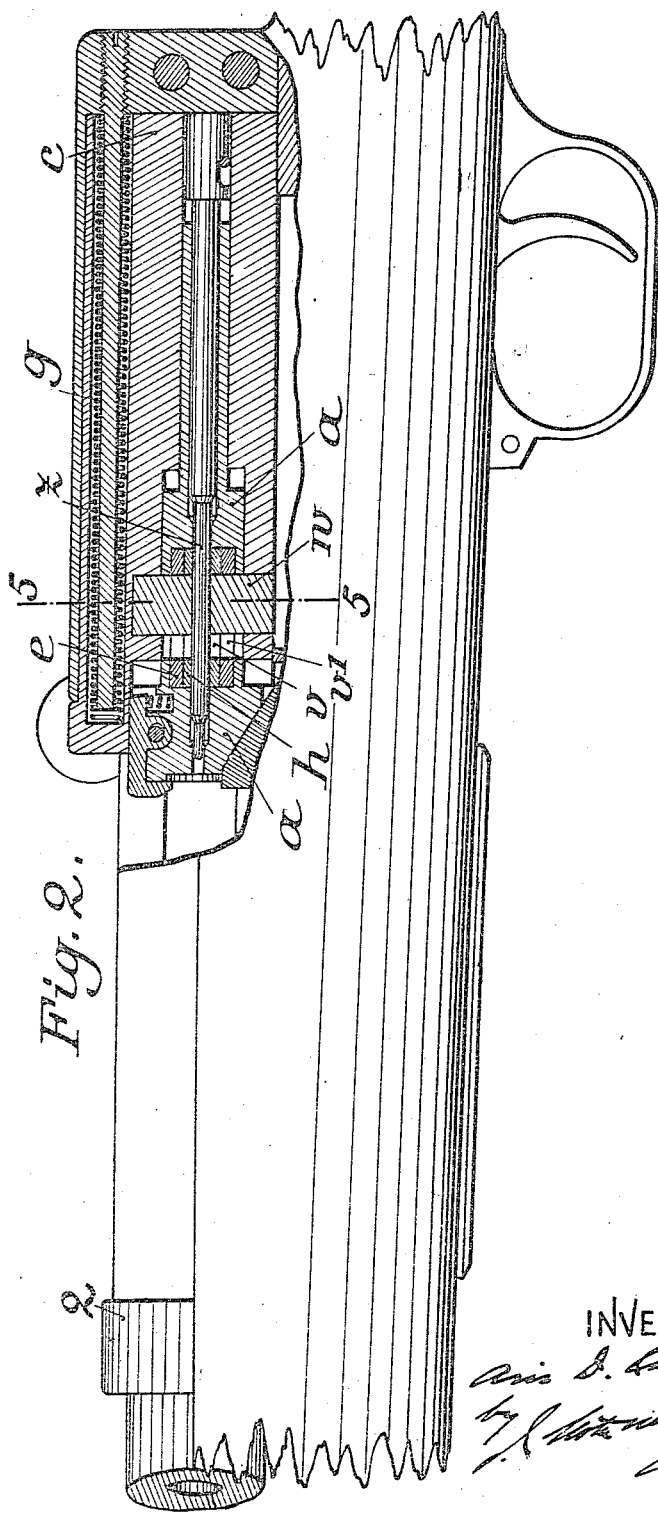

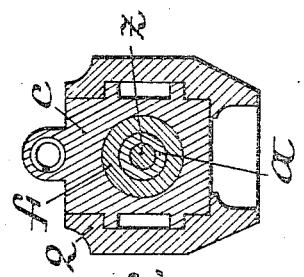
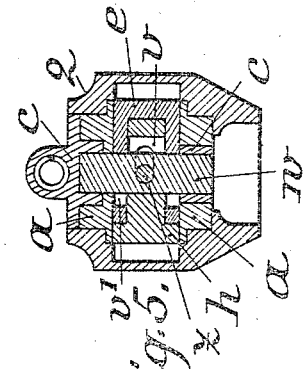
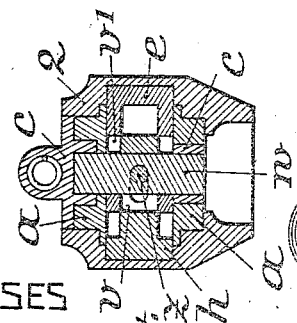
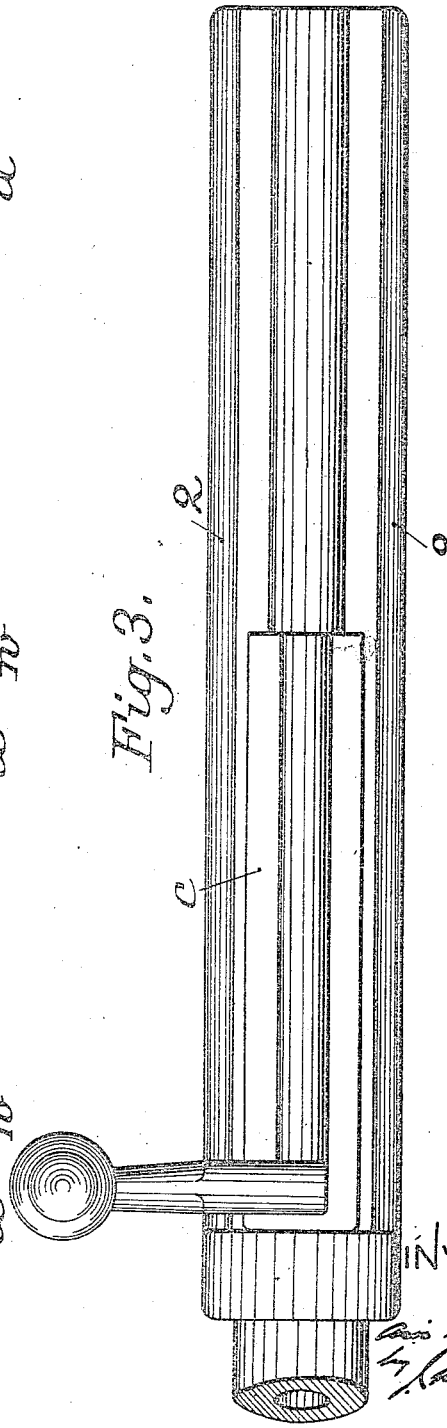

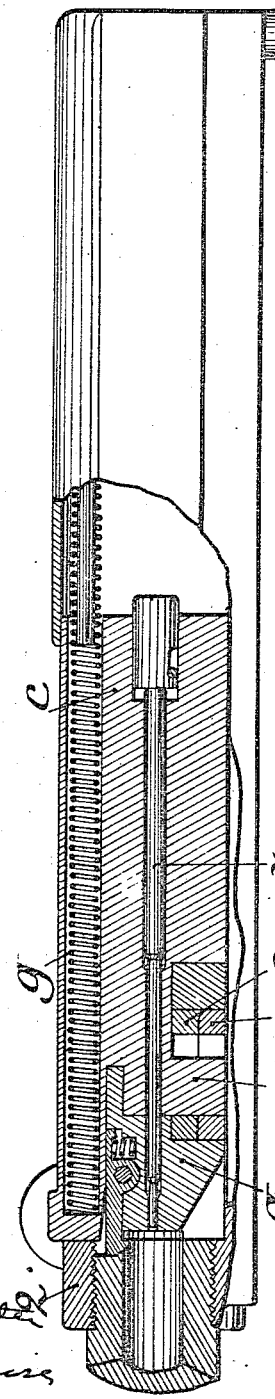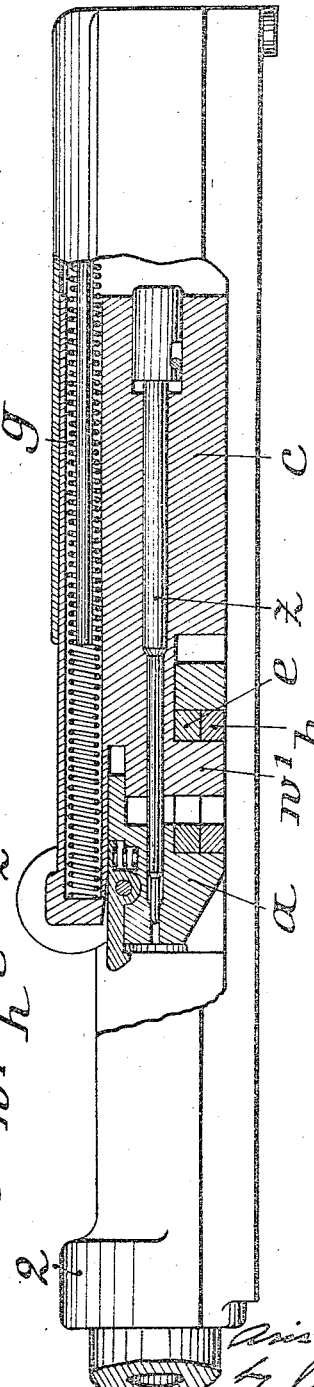

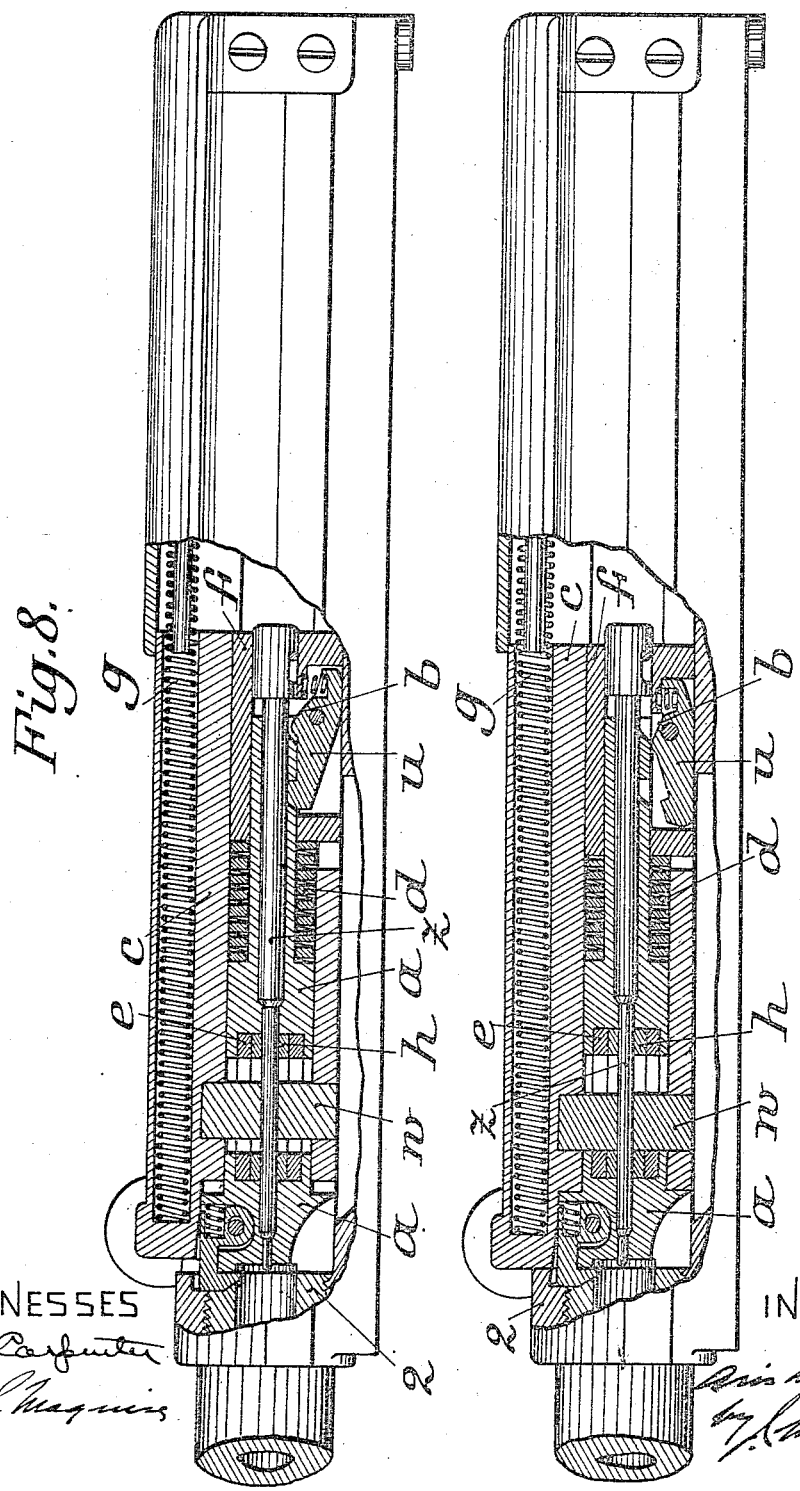

A. D. CHRONIS.
BREECH BLOCK MECHANISM FOR FIREARMS OR GUNS.
APPLICATION FILED DEC. 7, 1910.
1,043,670.
Patented Nov. 5, 1912.
13 SHEETS—SHEET 6.
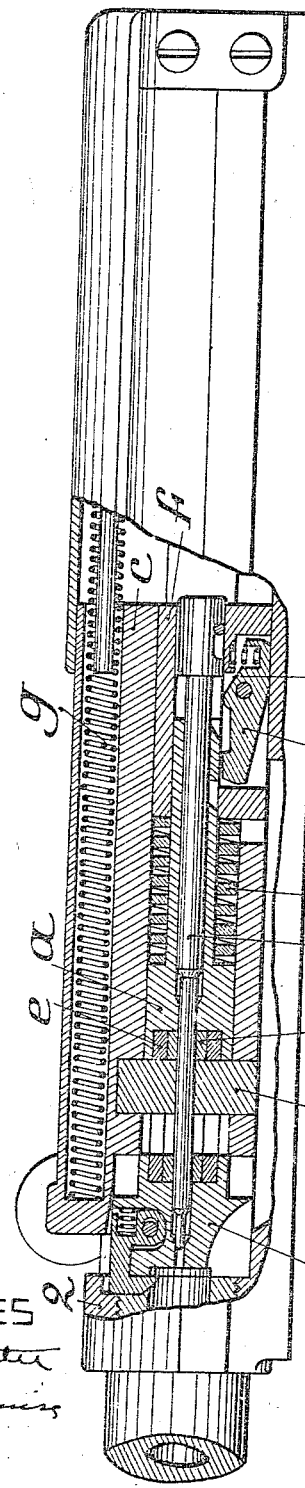
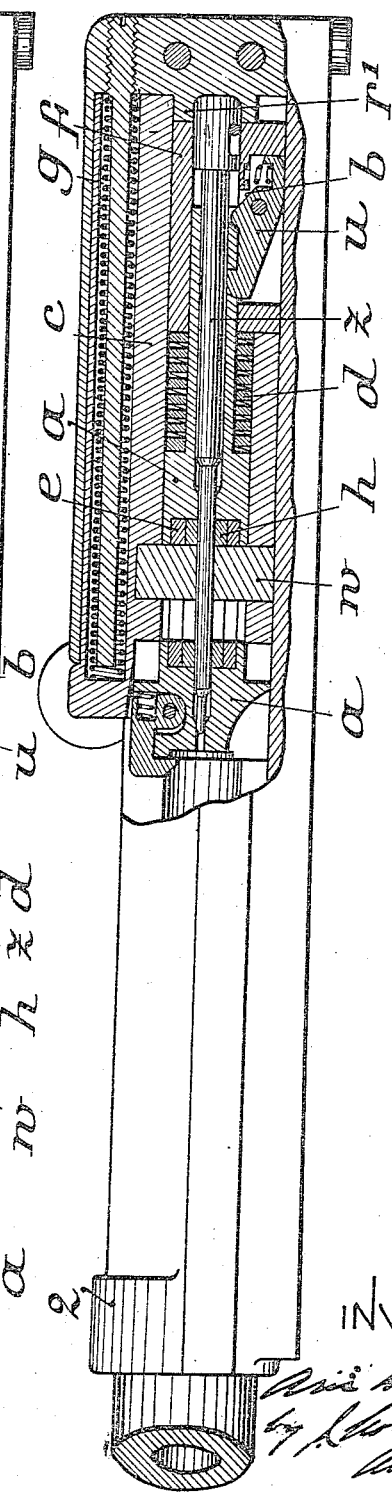

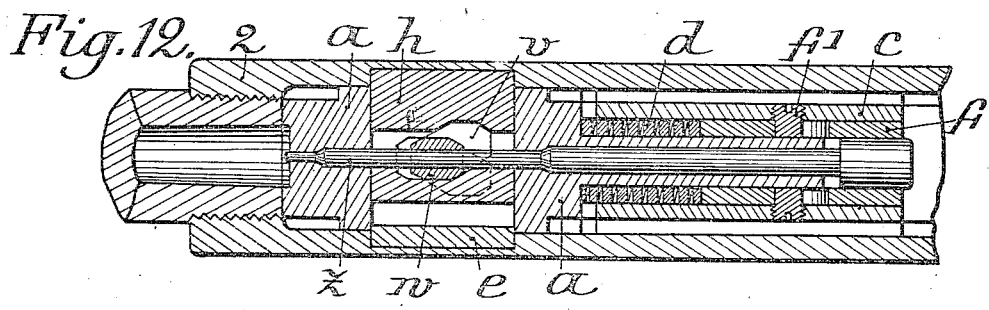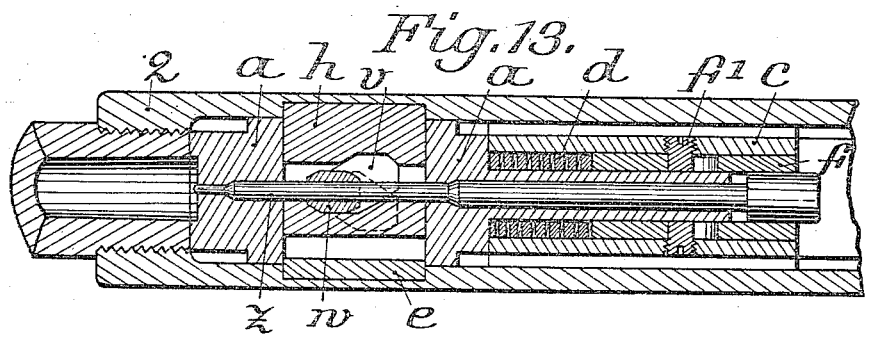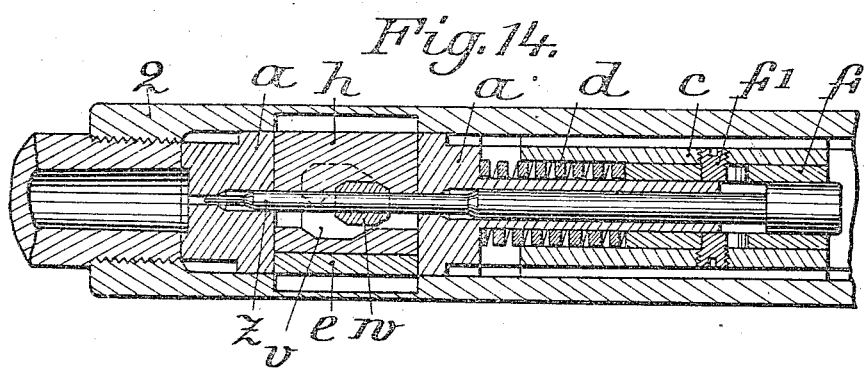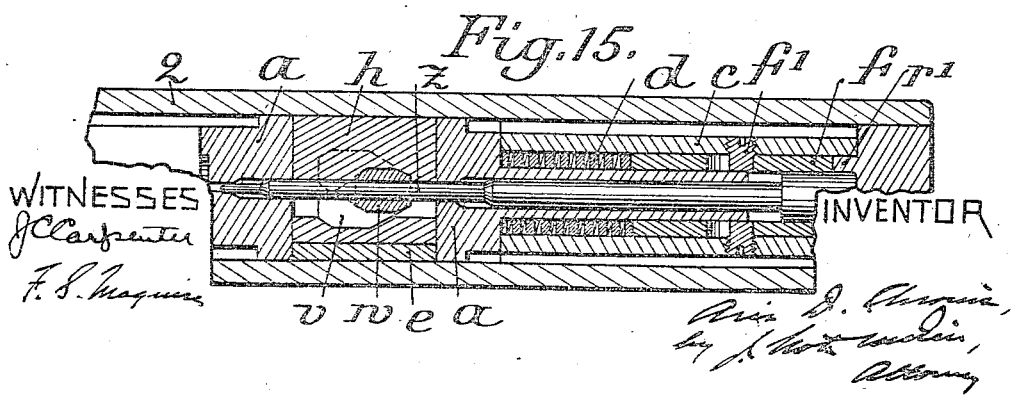

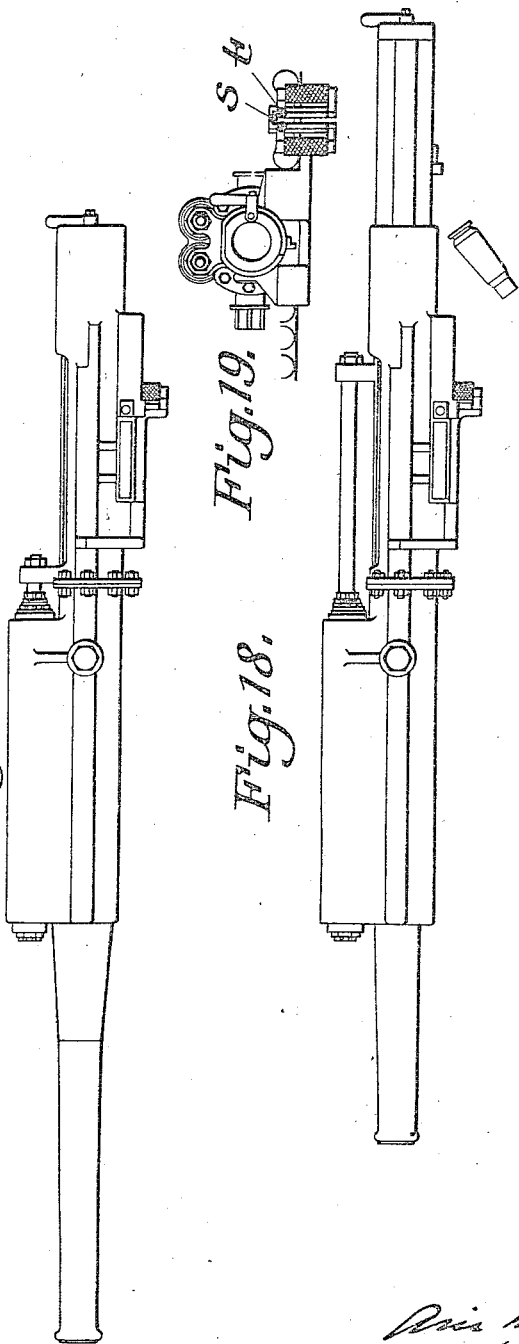

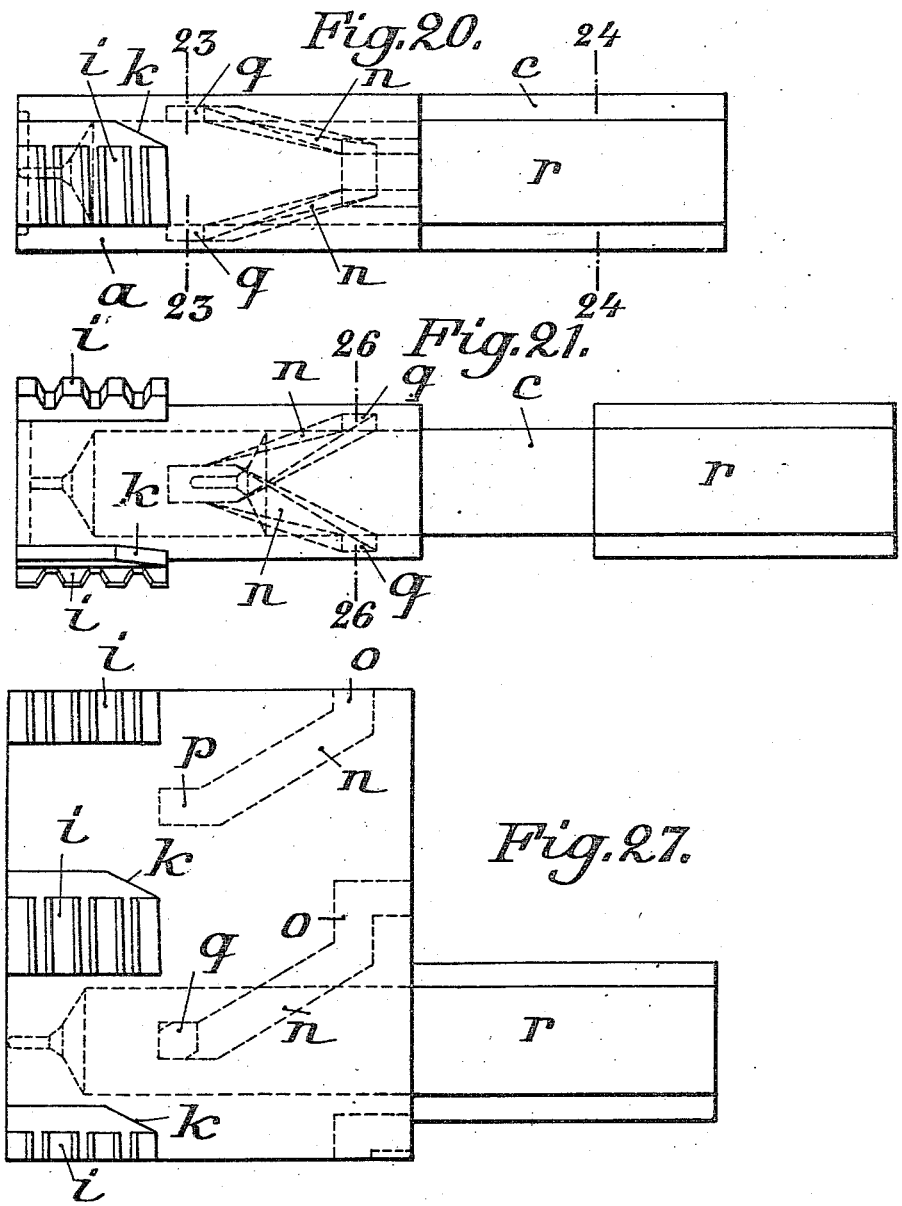

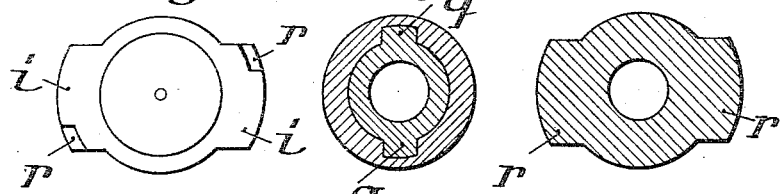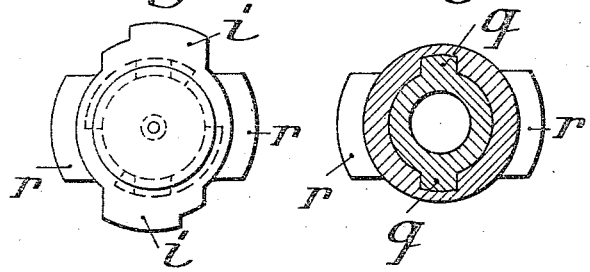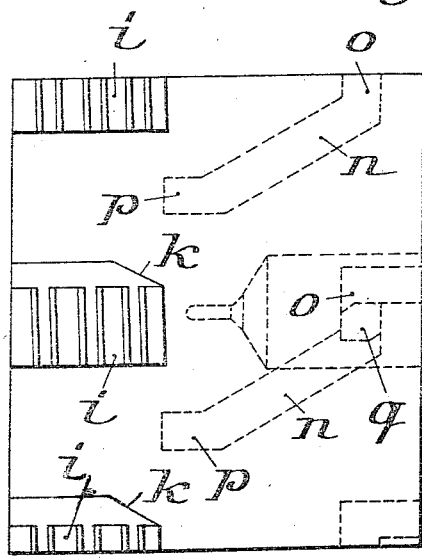

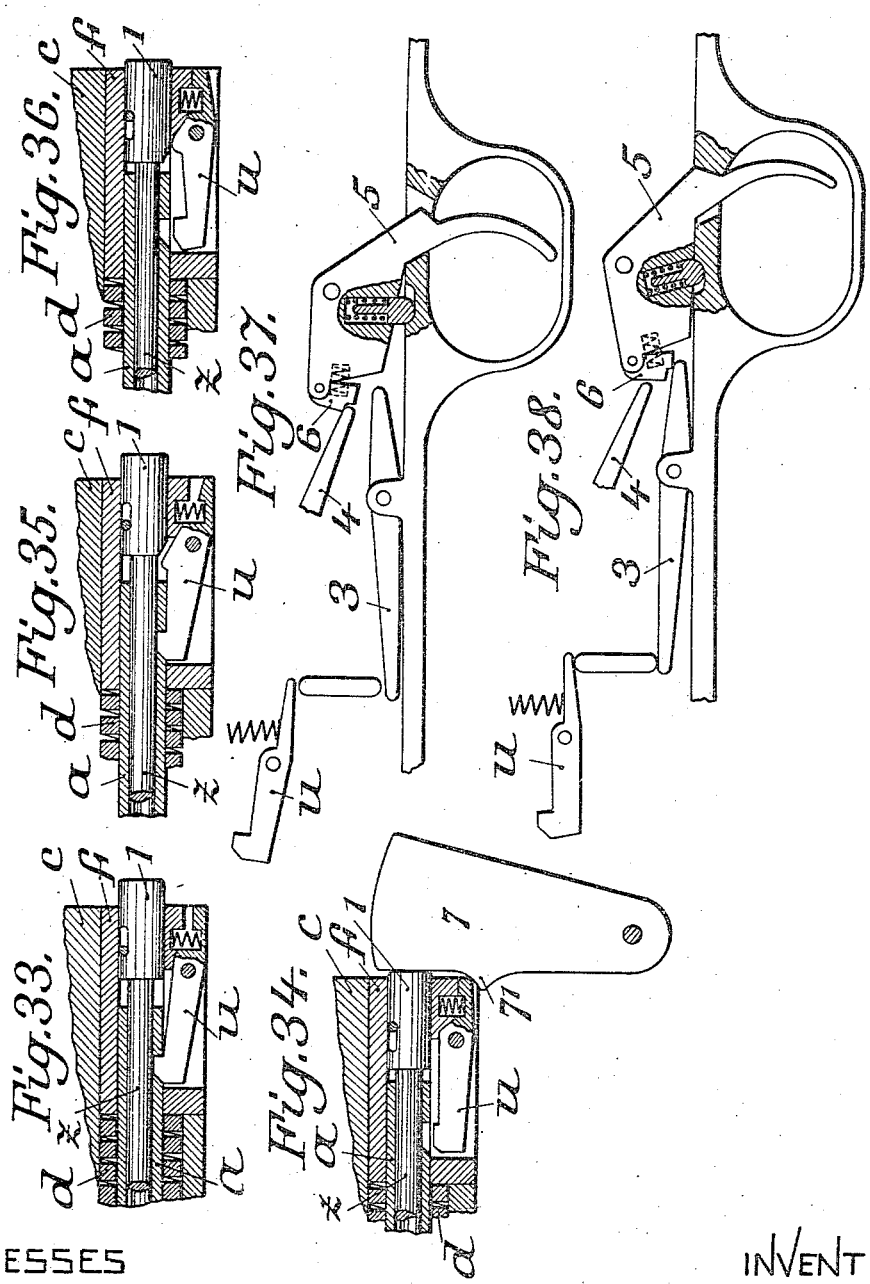

UNITED STATES PATENT OFFICE.

ARIS D. CHRONIS, OF DUSSELDORF, GERMANY, ASSIGNOR TO RHEINISCHE METALL-WAAREN- UND MASCHINENFABRIK, OF DUSSELDORF-DERENDORF, GERMANY, A CORPORATION OF GERMANY.

BREECH-BLOCK MECHANISM FOR FIREARMS OR GUNS.

1,043,670.  Specification of Letters Patent.  Patented Nov. 5, 1912.

Application filed December 7, 1910. Serial No. 596,049.

*To all whom it may concern:*

Be it known that I, ARIS D. CHRONIS, lieutenant, a subject of the King of Greece, residing at 161 Oststrasse, Dusseldorf, Germany, have invented certain new and useful Improvements in Breech-Block Mechanism for Firearms or Guns; and I do hereby declare the following to be a full, clear, and exact description of the invention, such as will enable others skilled in the art to which it appertains to make and use the same.

In firearms having a fixed barrel and a locked breech block it is a known construction to use a movable device, such as a piston movable in a cylinder, for unlocking the breech block, this device being pushed backward by the back thrust of the cartridge. This principle, however, has been applied solely to weapons using a comparatively small explosive charge, such as pistols.

This invention relates to firearms or guns wherein the breech-blocks are unlocked by the recoil of the whole weapon.

According to the invention a movable device moves backward during the recoil of the gun at first with the gun and when the latter has come to rest continues to move alone and thereby unlocks the breech block. In hand firearms the recoil occurs as a matter of course and is taken up by the shoulder of the person using the gun. In the case of guns with stationary carriages provision must be made for allowing the movement.

The invention will be hereinafter fully set forth and particularly pointed out in the claims.

In the accompanying drawings there are shown several constructions according to the invention.

Figure 29:
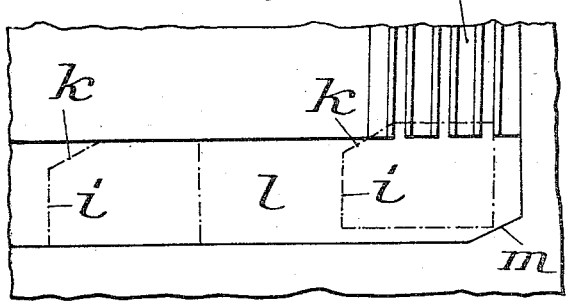
Figure 30:
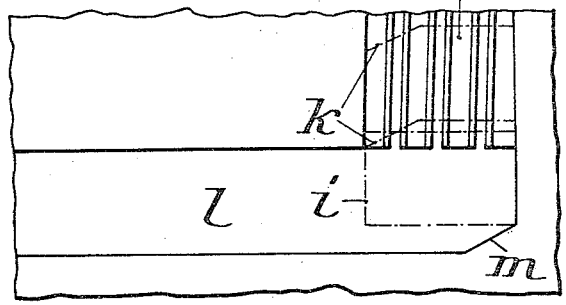
Figure 31:
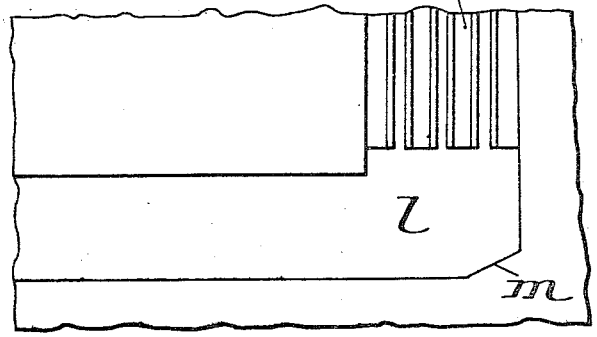
Figure 32:
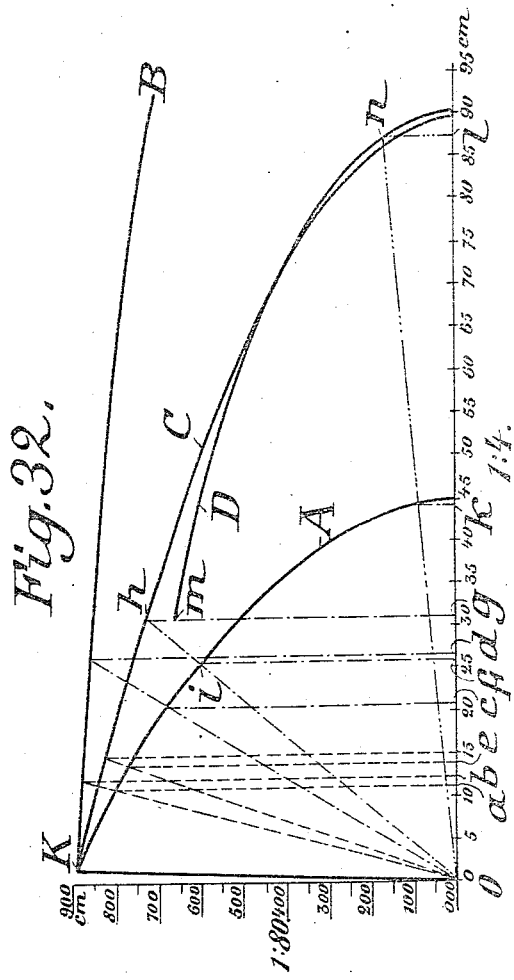

Figure 1 is a longitudinal section through a rifle constructed according to the invention, the position of the parts being that which they have immediately before the rifle is fired. Fig. 2 is a similar section after the recoil. Fig. 3 is a plan of the rifle. Fig. 4 is a section on line 4—4 of Fig. 1. Fig. 5 is a section on line 5—5 of Fig. 2. Figs. 6 and 7 are views corresponding with Figs. 1 and 2 respectively of a somewhat modified form of the rifle. Another modification is shown in Figs. 8–11 in longitudinal vertical section, the several figures showing the different positions of the parts. Figs. 12–15 are horizontal sections corresponding respectively with Figs. 8–11. Fig. 16 is a cross section of this form. Fig. 17 is a side elevation of a gun having a recoiling barrel and constructed according to this invention. Fig. 18 is an elevation of the same gun after it has been fired and the barrel and breech block are in their rearmost position. Fig. 19 is a rear elevation of this gun. Fig. 20 shows the locked breech block of the gun. Fig. 21 shows the unlocked breech block of the gun. Fig. 22 is a front elevation of the breech block of the gun. Figs. 23 and 24 are cross sections on lines 23—23 and 24—24 of Fig. 20. Fig. 25 is an elevation of the breech block in the position shown in Fig. 21. Fig. 26 is a section on line 26—26 of Fig. 21. Figs. 27 to 28 are developments of the forward parts of the breech block in the position corresponding with Figs. 20 and 21 respectively. Figs. 29 to 31 are developments of the breech block casing showing different positions of the teeth of the forward part of the breech block during and after the locking. Fig. 32 is a diagram showing the speeds, paths and times of the recoil of the barrel and the breech block. Figs. 33 to 38 show devices which in the construction shown in Figs. 8–16 may release the action of the gun otherwise than by the recoil.

In the construction shown in Figs. 1 to 5 the breech block consists of two parts, an inner part $a$ and an outer part $c$, the part $a$ at its forward end being designed to rest against the breech end of the barrel. The part $a$ lies within the part $c$ and between them there is a relative movement. A closing spring $g$ is fitted in a socket in the outer part $c$. The inner part $a$ has a recess in which are located locking slides or bolts $e$ and $h$, which are movable at right angles to the axis of the gun, and designed to normally take in notches 3 in the casing 2, thereby locking the parts $a$ and $c$ to such casing. This locking arrangement is clearly shown in Figs. 4, 12 and 13, and 5 and 14. The bolt $e$ is of U-shape in cross section and the bolt $h$ is of T-shape in cross section, the long arm of the T-bolt $h$ working in the space between parallel arms of the U-bolt $e$. In the overlapping portions of the bolts $e$ and $h$ are coincident slots $v$ and $v'$ which are diagonal to the axis of the gun and at right angles to each other, their forward ends overlapping when the bolts are in their laterally extended positions, as shown in Figs. 12 and 13, and their rear ends overlapping when the bolts are withdrawn by the movement of part $c$ relatively to part $a$, as shown in Figs. 14 and 15. The form of the slots $v$, $v'$ may be seen in the horizontal sections, Figs. 12 to 15, which although they relate to another construction agree with the construction shown in Figs. 1 to 5 in respect of the parts now mentioned. Through these slots in the bolts $e$ and $h$ extends a pin $w$ (Figs. 1, 2, 4, 5 and 12 to 15) which is rigidly connected with the outer part $c$ of the breech block. The bolt $h$ is also slotted or perforated (Figs. 4 and 5) so that the firing pin $z$ can pass freely through it and does not hinder the bolt in the movement for locking and unlocking the breech block. In consequence of the inclined surfaces of the slots $v$ and $v'$ of the bolts $e$ and $h$, the latter are drawn toward each other when the outer part $c$ of the breech block is drawn backward (Figs. 5 and 14) and are moved apart when the part $c$ is pushed forward (Figs. 4, 12 and 13). The operation of this device is as follows: After firing, the whole rifle moves backward until, in the case of a hand weapon, it is brought up by the shoulder of the user or, in the case of a weapon with stationary support, it is brought to rest thereby. The outer part $c$ of the breech block, owing to its momentum then moves farther backward relative to the part $a$ and carries with it the pin $w$ which slides in the inclined slots $v$ and $v'$ of the bolts $e$ and $h$ and draws these bolts together toward the middle so that they move from the position shown in Figs. 12 and 13 into that shown in Fig. 14. In this latter position they no longer engage in the notches 3 in the inner surface of the casing 2 and therefore unlock the inner part $a$ of the breech block. At this instant the pin $w$ has arrived at the rear ends of the slots $v$ and $v'$ so that the outer part $c$ of the breech block carries with it the forward part $a$ until the position of the parts is that shown in Fig. 2. When the parts are in this position the ejection of the empty cartridge case and the introduction of a new cartridge occur in the known manner. When the position shown in Fig. 2 has been attained if there is no locking of the parts in this position, as is sometimes the case in known constructions, the closing spring $g$ returns the whole breech block into the position shown in Fig. 1, and at the completion of this return movement the part $c$ again moves relatively to the part $a$ and through the pin $w$ the bolts $e$ and $h$ are forced laterally into locking engagement with the notches 3 of casing 2.

The construction shown in Figs. 6 and 7 is essentially the same as that shown in Figs. 1 to 5 only instead of the pin $w$ inserted in the outer part $c$ of the breech block as a separate piece, there is used a projection $w'$ engaging in the part $a$ of the breech block. In this case the cavity containing the bolts $e$ and $h$ is situated in the bottom of the part $a$ instead of centrally thereof.

In respect of the parts described with reference to Figs. 1 to 5 the construction according to Figs. 8 to 16 agrees with the first construction. In the last-named figures, however, the action of the movable device which, when the gun recoils, first travels together therewith and when the gun comes to rest continues the backward movement for unlocking the breech block, is reinforced by a spring which comes into action when the recoil has shifted the movable device. By this arrangement the mass of the movable device can be diminished. In Figs. 8 to 16 the parts lettered $a$, $c$, $e$, $g$, $h$ and $z$ are precisely similar to the similarly lettered parts in Figs. 1 to 5; the arrangement is, however, different in the following respect. In the part $c$ there is a sleeve $f$ which is rigidly connected with the part $c$ by a screw $f'$ (Figs. 12 to 15). Between the sleeve $f$, and therefore between the outer part $c$, and the inner part $a$ of the breech block there is a spring $d$. When the breech block is locked the parts are in the position shown in Figs. 8, 12 and 4, that is to say the two parts $a$ and $c$ of the breech block are moved about 3 mms. in opposite directions longitudinally of the axis of the pin by the compressed spring $d$. A pawl $u$ pivoted to the sleeve $f$ and engaging in a notch in the part $a$ of the breech block keeps the spring $d$ compressed. When the gun is fired it and the part $a$ of the breech block move backward in consequence of the recoil, the casing 2 being rigidly coupled with the part $a$ by the bolts $e$ and $h$ (Figs. 12 and 13); the outer part $c$, however, remains at rest by virtue of its inertia, since it is not rigidly connected with the other parts of the gun, that is to say, abutting portions of the parts $c$ and $a$ are brought nearer together; the spring $d$ is thus somewhat further compressed and the parts have the position shown in Figs. 9 and 13. At the same time the pawl $u$ liberates the spring $d$ since the projection $b$ on the pawl strikes against an inclined surface on the part $a$ so that the pawl is forced out of engagement with the latter. When the part $c$ has relatively moved forward so far that it strikes against the part $a$ (Figs. 9 and 13), it travels with the rest of the gun carrying with it the sleeve $f$ with which it is connected by the screw $f'$. When the gun comes to rest the outer part $c$ of the breech block, in consequence of its momentum and of the pressure of the spring $d$, continues to move backward and causes the pin $w$ to press against the inclined surface of the slots $v$ and $v'$ in the bolts $e$ and $h$ (Figs. 10 and 14), whereby the bolts are pushed toward each other and the breech block is unlocked. When the empty cartridge case has been ejected and the breech block has arrived at its rearmost position (Figs. 11 and 15) the spring $d$ is again compressed because the sleeve $f$ abuts against a cylindrical block $r'$ (Figs. 11 and 15) so that it is ready to come into action again at the next shot. The release of the compressed spring $d$ can also be effected by the recoil directly or indirectly by the movement of one of the other parts, such as the firing bolt, the cock or the trigger plate. In that case if the compression of the spring $d$ is kept sufficiently strong it is possible for the spring in the case of a misfire to unlock the breech automatically. Devices of this kind are shown in Figs. 33 to 38. In Figs. 33 and 34 the spring $d$ is released by the hammer 7. Fig. 33 shows the pawl in the locked position and Fig. 34 in the position which it has at the moment when the spring $d$ is liberated by a blow delivered by the projection 7′ of the hammer at the same time that the upper part of the hammer is striking the firing pin. Figs. 35 and 36 show the release of the pawl by means of the firing pin. When the firing pin strikes the ignition cap, that is to say in its forward movement, it slides over a projection on the pawl $u$ and thereby liberates the spring $d$. It is obvious that instead of a firing pin driven forward by a hammer a spring operated firing pin may be used. Figs. 37 and 38 show how the pawl may be released by the trigger plate. 4 is the rod which liberates the firing pin. By pressing down the trigger plate the rod 4 is also depressed and liberates the firing pin; the rod 4 then slides free of the projection 6 and resumes its former position. The projection 6 then comes in contact with the lever 3 and the pawl $u$ is operated to release the spring $d$.

Figs. 17 to 32 show the application of the invention to a gun having an automatically recoiling barrel. In this case the movable device first moves with the recoiling barrel and after the latter has acquired its greatest speed moves independently of the barrel and at a still greater speed in the same direction and unlocks the breech block. The arrangement is preferably such that the barrel and the breech block attain their rearmost position at the same time for which purpose there is applied to the barrel a more powerful brake than is applied to the device for unlocking the breech block. The advantage is hereby attained that the breech block in its rearmost position uncovers the opening for the introduction of the cartridge and thus the empty cartridge case of the preceding shot can be ejected through the same opening, so that it can be received in a pocket or other container without troubling the gunner. In this construction the breech block consists of two parts relatively movable in the longitudinal direction, namely a front part $a$ and a rear part $c$ (Figs. 20 and 21). The forward part $a$ is adapted to rotate and carries teeth $i$ having an inclined surface $k$ (Figs. 20, 21, 27 and 28). At its rear end the part $a$ has two inclined slots $n$ which terminate at both ends in straight slots $o$ and $p$. The rear part $c$ of the breech block has two lugs $q$ (Figs. 20, 21, 23, 26, 27 and 28) which engage in the slots $p$, $n$, $o$. It is guided rectilinearly in the breech block casing by ribs $r$. When the breech block is locked and the firing bolt is cocked, the latter being preferably connected with the part $c$ of the breech block, the parts have the position shown in Figs. 20 and 27, wherein the lugs $q$ of the part $c$ are in the portions $p$ of the slots $p$, $n$, $o$. This is the position in which the gun is fired. After firing, the barrel and breech block recoil and attain in the known manner a maximum speed after having recoiled a short distance. The barrel is then braked in known manner by the recoil brake and the return spring so that it comes to rest after it has traversed a certain part. During the braking, however, the part $c$ of the breech block, in consequence of its momentum continues its movement with the speed which it has received by the recoil and which has been only slightly diminished by the closing spring. The part $c$ therefore outstrips the barrel and the front part $a$ of the breech block which is locked to the latter and the lugs $q$ of the part $c$ enter the inclined portions $n$ of the grooves $p$, $n$, $o$. Since the part $c$ is prevented from rotating the engagement of the lugs $q$ in these inclined portions of the groove rotate the part $a$ and thus unlock the breech block. As soon as the lugs $q$ are at either end of the inclined portion of the grooves they strike against the faces of the straight portions $o$ of the grooves and the two portions of the breech block continue the rectilinear movement together. During the movement of the lugs $q$ in the inclined portions of the slots the locking teeth $i$ of the forward part $a$ of the breech block are not turned sufficiently to liberate them from the helical grooves $y$ in the barrel, but have approximately the position indicated in dotted lines in Fig. 30. As, however, as already stated, the part $c$ now draws the part $a$ with it in an axial direction, the inclined surface $k$ of the teeth $i$ are brought against the edge of the guiding groove $l$ in the breech block casing and the necessary rotation is completed. This brings the lugs $q$ into the position shown in Fig. 28 and the two parts of the breech block remain in this relative position during the remainder of the recoil. When the barrel has finished recoiling it is brought forward again by the return spring and at the end of its movement the cartridge belt (Fig. 19) is moved and a new cartridge is brought into the cartridge chamber. The whole breech block is now returned by the closing spring, the parts $a$ and $c$ being still coupled together by the lugs $q$ and the cartridge is introduced into the barrel. As soon as the teeth $i$ strike the inclined faces $m$ of the groove $l$, the part $a$ of the breech block is turned in the direction corresponding with that in which the lugs $q$ turn to pass from the straight portion $o$ into the inclined portion $n$ of the grooves. During the rest of the return the part $c$ of the breech block travels alone and owing to the engagement of the lugs $q$ in the inclined portions of the grooves rotates the part $a$ so that it becomes locked. The teeth $i$ of the part $a$ of the breech block are formed in two steps so that at the beginning of the rotation the movement is not prevented by the grooves $y$ of the breech block casing (Figs. 29 and 30). Instead of this arrangement the grooves $y$ of the casing can be shortened as shown in Fig. 31. When a single shot is to be fired the rear part $c$ of the breech block is caught in the return stroke by the trigger guard in the position in which the lugs $q$ are at the forward end of the inclined grooves $n$ and therefore are in engagement with the parts $p$ of these grooves. By then liberating the trigger guard rear part $c$ of the breech block (which carries the firing pin) under the action of the closing spring snaps into the straight part $p$ of the groove.

The firing device constitutes no part of the present invention. It is constructed in the same manner as in known machine guns.

In firing the safety lever $s$ is raised upward and the knob $t$ pressed (Fig. 19).

In Fig. 32 are shown the speeds, paths and times of the recoil of the barrel and the breech block of a 4.5 cm. machine gun with a recoil path of 45 cms. The two-part breech block weighs for example 7 kilos, the front part being 3 kilos and the rear part 4 kilos. The mean pressure of the closing spring amounts to 30 kilos. On the horizontal axis are marked the recoil paths of the barrel or the breech block on a scale of 1.4. On the vertical axis the corresponding speeds are marked on a scale of 1 to 80. The curve O K A represents the coil speed curve which attains its maximum at K corresponding with a value of 9 meters after the barrel has recoiled through a path of about 20 mms., and diminishes to zero after the barrel has recoiled through a path of 450 mms. O K B shows the speed of the rear portion of the breech block when running freely, that is to say when the closing spring is not considered and O K C is the curve of the speed of the rear part of the breech block when there is a closing spring. When the gun is fired the barrel and breech block travel together up to the maximum speed of 9 meters. The rising branch O K of the curves O K A, O K B and O K C is common to all three curves. For the sake of safety, the breech may not be opened as long as there is still gas pressure in the gun and therefore not while the breech block is running freely, that is to say by an oversight the closing spring is not brought into action. Assuming that the breech block is running freely and that the lugs $q$ of the rear portion $c$ before they enter into the inclined grooves $n$ must move in a straight path of 10 mms., the rear portion of the breech block must outdistance the barrel by 10 mms., before the unlocking begins and by about 60 mms. while the unlocking of the breech block is occurring; in this manner the gases have time to escape completely. From the equations of the curves O K A and O K B it is easy to determine graphically the positions of the distances. $a-b=10$ mms. and $c-d=60$ mms. It follows that the barrel must travel through a path O $a=110$ mms. before the unlocking of the breech block begins and through a path O $c=210$ mms. before the breech block has been completely unlocked. When the breech block is braked it begins to open after the barrel has traveled through a path O $e=140$ mms. and is fully unlocked when the barrel has traveled through the path O $f=260$ mms. After complete unlocking of the breech block the rear portion $c$ thereof which at this moment possesses the speed $g\ h$ (Fig. 32), must carry with it the front portion of the breech block which has the speed $f\ i$. The resultant speed is $g\ m$ and the breech block moves further in accordance with the curve D. In the foregoing example the breech block attains its rearmost position at a speed of $l\ m=1.6$ meters and the barrel is at this moment at $k$, a short distance before its rearmost position.

Having thus described the nature of my invention and the best means I know of carrying the same into practical effect, I claim:—

1. In an automatic firearm designed to recoil as a whole, a breech-block composed of two parts, between which there is a relative movement, means for normally holding such parts in fixed relation to each other, means for normally locking the breech-block to a relatively fixed part of the firearm, means for effecting the relative movement between the parts when they are disconnected and simultaneously unlocking the breech-block, such relative movement as well as the unlocking of the breech-block occurring after the gun has been brought to rest.

2. In an automatic firearm designed to recoil as a whole, a breech-block composed of two parts between which there is a relative movement, means for normally locking one of the parts to a relatively fixed portion of the firearm, means for normally locking the two parts together, means for automatically disconnecting such parts, means for effecting the relative movement between the two parts when they are disconnected and for simultaneously unlocking the breech-block to permit the two parts to recoil independently of the gun after the latter has been brought to rest.

3. In an automatic firearm designed to recoil as a whole, a breech-block composed of two parts between which there is a relative longitudinal movement, means for normally locking the breech-block to a relatively fixed portion of the firearm, means for normally holding the two parts connected together, means for automatically disconnecting such parts, a spring interposed between said parts for effecting a relative movement between them when disconnected, and means carried by one of said parts for automatically unlocking the breech-block during such relative movement.

4. In a firearm having a breech-block composed of two parts between which there is a relative movement, means for locking the breech-block to a relatively fixed portion of the firearm comprising oppositely movable slides, and a member carried by one of said parts for automatically releasing said slides during the relative movement between the parts.

5. In a firearm having a breech-block composed of two parts between which there is a relative movement, means for locking the breech-block to a relatively fixed portion of the firearm comprising oppositely movable slides having coincident openings, and a member carried by one of said parts and projecting through said openings to engage both slides for automatically releasing them during the relative movement between the parts.

6. In a firearm having a breech-block composed of two parts between which there is a relative movement, means for locking the breech-block to a relatively fixed portion of the firearm comprising oppositely movable slides having coincident openings with inclined walls, and a member projecting through said openings and formed to engage said walls to move said slides in opposite directions during the relative movement between said parts.

7. In an automatic firearm designed to recoil as a whole, a breech-block composed of two parts between which there is a longitudinal movement, means for normally locking one of the parts to a relatively fixed portion of the firearm comprising oppositely movable slides carried by one of the parts and designed to engage a relatively fixed portion of the firearm, said slides having coincident openings and a member carried by the other part of the breech-block for moving said slides in opposite directions during the relative movement between the parts of the breech-block.

8. In an automatic firearm, a breech-block composed of two parts between which there is a relative movement, one part being fitted in and carried by the other part, oppositely movable slides carried by the inner part and designed to lock the breech-block to a relatively fixed portion of the firearm, said parts having abutting portions, a member carried by the outer part and engaging said slides for moving them in opposite directions, and a main spring acting on said breech block.

9. In an automatic firearm, a breech-block composed of an inner part and an outer part, between which parts there is a relative movement, a spring interposed between said parts for moving them relatively to each other, a pawl carried by one part for locking the two parts together, means for automatically disengaging said pawl, means for locking said block to a relatively fixed portion of the firearm, and means for automatically releasing the lock during the relative movement between the parts under the action of the spring.

10. In an automatic firearm, a breech-block composed of an outer part and an inner part between which there is a relative movement, a spring interposed between said parts for moving them relatively to each other, a pawl carried by one of said parts and normally holding the other part in fixed relation thereto, said pawl being automatically released upon the recoil of the gun producing a relative movement between the two parts, means for locking the block to a relatively fixed portion of the firearm, and means for automatically releasing said lock when said parts are moved relatively to each other under the action of the spring.

In testimony whereof I have signed this specification in the presence of two subscribing witnesses.

ARIS D. CHRONIS. [L. S.]

Witnesses:
 ALFRED HENKEL,
 WALTER VONNEGUT.